H. D. COOKE & A. FORNANDER.
APPARATUS FOR EXTRACTING BUTTER FAT FROM MILK.
APPLICATION FILED MAR. 20, 1907.

917,008.

Patented Apr. 6, 1909.

3 SHEETS—SHEET 2.

UNITED STATES PATENT OFFICE.

HENRY D. COOKE, OF MONMOUTH BEACH, NEW JERSEY, AND ALFRED FORNANDER, OF NEW YORK, N. Y.; SAID FORNANDER ASSIGNOR TO AMERICAN FARM PRODUCTS COMPANY, OF NEW YORK, N. Y., A CORPORATION OF NEW JERSEY.

APPARATUS FOR EXTRACTING BUTTER-FAT FROM MILK.

No. 917,008.　　　　Specification of Letters Patent.　　Patented April 6, 1909.

Application filed March 30, 1907. Serial No. 365,494.

*To all whom it may concern:*

Figure 1:
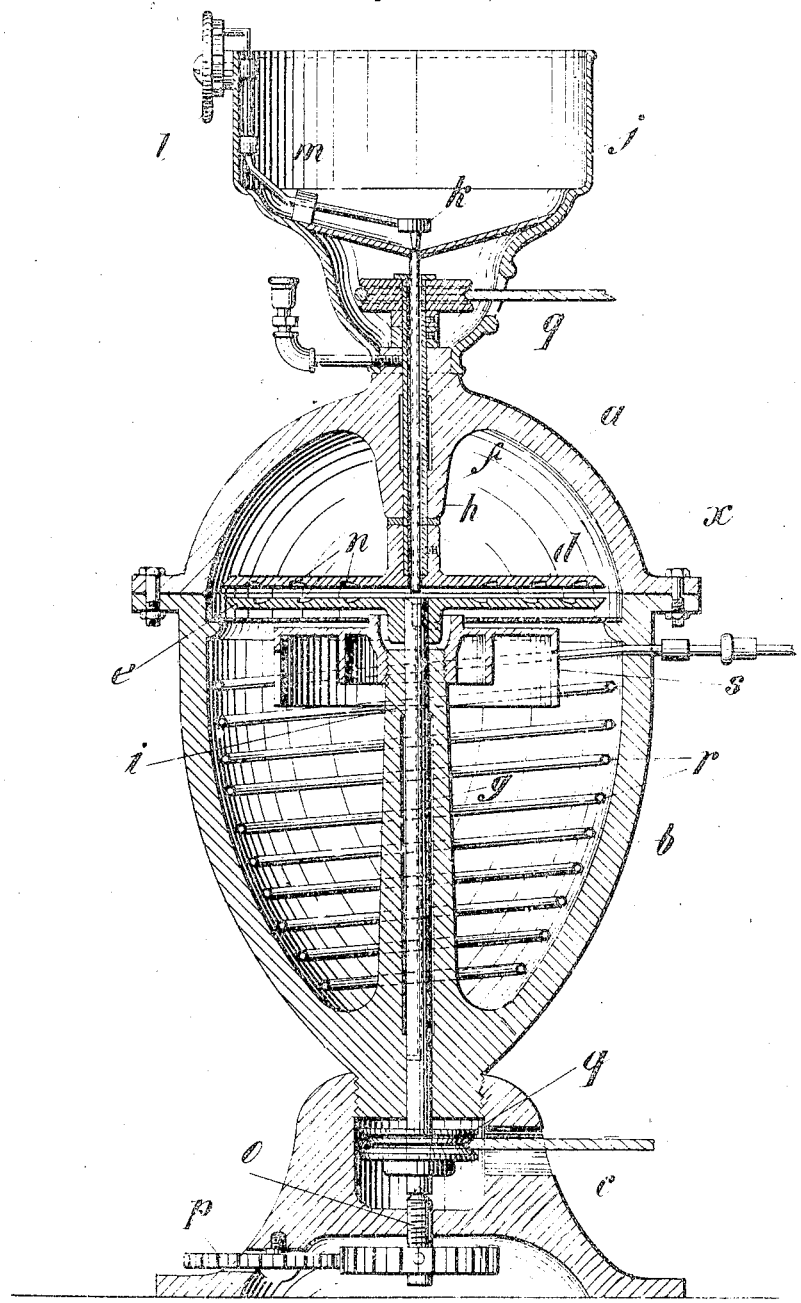
Figure 2:
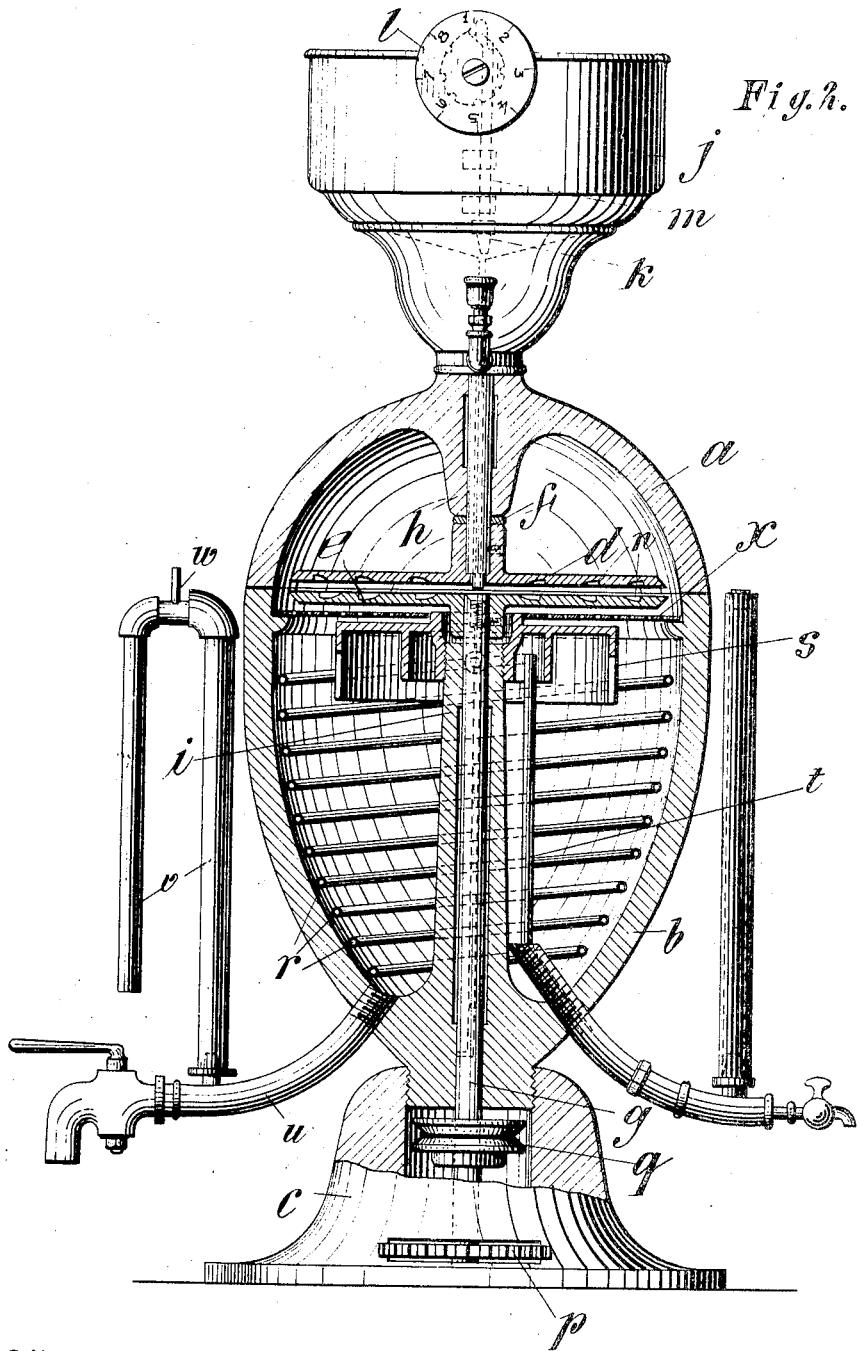
Figure 3:
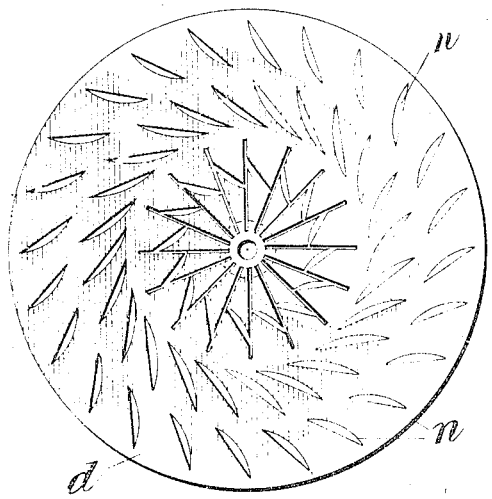
Figure 4:
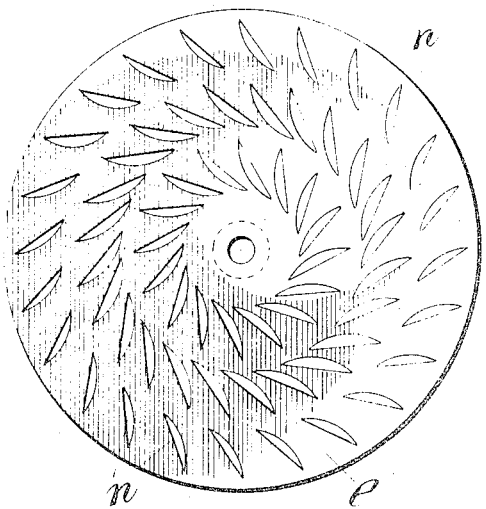
Figure 5:
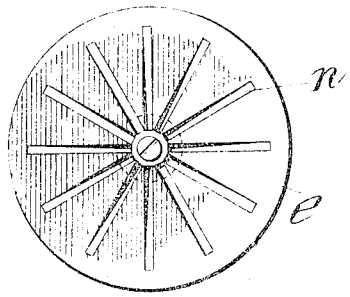
Figure 6:
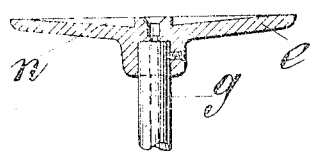
Figures 7, 8:
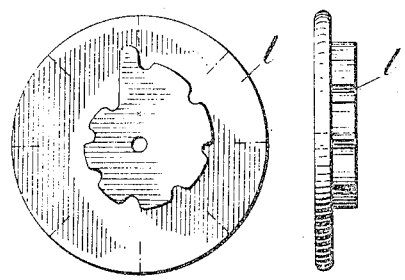

Be it known that we, HENRY D. COOKE, a citizen of the United States, and a resident of Monmouth Beach, in the State of New Jersey, and ALFRED FORNANDER, a citizen of the United States, and a resident of the borough of Manhattan, of the city of New York, in the county and State of New York, have invented certain new and useful Improvements in Apparatus for Extracting Butter-Fat from Milk, of which the following is a specification, reference being had to the accompanying drawings, forming a part hereof.
The object of this invention is to provide an apparatus in which milk may be converted as a whole into a comparatively thick homogeneous liquid mass or emulsion, and further, to provide means whereby, after such conversion has taken place, the butter fat may be extracted and removed from the emulsified milk without transferring such milk from the chamber or vessel in which the emulsification has been effected. In other words, the invention consists not only in providing means for emulsifying milk but in the provision of an apparatus for extracting the fat contained therein in one continuous operation.
The improvements will be more fully described in connection with the accompanying drawings in which an apparatus forming one of the practical embodiments of the invention is illustrated.
In said drawings: Figure 1 is a view in vertical central section of the apparatus. Fig. 2 is a similar view upon a plane taken at right angles to that of Fig. 1. Figs. 3 and 4 are respectively plan views of the opposing faces of two disks which may be employed in emulsifying the milk. Figs. 5 and 6 are respectively a plan view and a view in a vertical section of another disk which may also be so employed, and, Figs. 7 and 8 are respectively a front and end elevation of a hand wheel for operating and controlling the milk valve.

The apparatus is provided with what may be termed a working chamber which may be formed of two castings *a* and *b* suitably bolted together so as to be easily detached, the lower casting *b* resting upon a base or stand *c* with which it is illustrated as being in threaded engagement. In said chamber and preferably in the upper portion thereof and near the plane where the castings *a* and *b* join, are two disks *d* and *e* which are mounted to rotate in a substantially horizontal plane. The respective shafts *f* and *g* upon which these disks are mounted are journaled in bearings *h* and *i* formed upon the castings *a* and *b* respectively and extending into the working chamber, as clearly illustrated in the drawings.

The milk is introduced into a receiving vessel *j* which surmounts the working chamber and thence is delivered between the disks *d* and *e* through the shaft *f* which is made hollow for this purpose, the delivery of the milk between the disks being controlled by a suitable valve *k*. The position of this valve may be varied to permit the flow of milk to be more or less rapid, as conditions may require, by a graduated hand-wheel *l* mounted upon the receiving reservoir *j* and in operative engagement with a sliding rod *m* to which the valve *k* is secured. The disks *d* and *e* between which the milk is delivered substantially at the center thereof, have their opposing faces or surfaces roughened and for this purpose are preferably formed with cuts *n* of such a nature as to produce sharp edges whereby, as the disks rotate, they will produce a shearing action upon the milk or the fat globules contained therein. As illustrated in Figs. 3 and 4, these cuts are formed with a rotating tool having its periphery oblique to its radius. The sharp edges upon the disks may be otherwise formed however and in fact other means than sharp edges may be provided upon the disks to produce the disturbance in the milk necessary to emulsify the same. In the present case, these edges are arranged upon the disks so that they extend toward the periphery of the same and in a direction slightly oblique to the radial. Moreover, in one of the disks, in the present case in the upper disk which is illustrated in Fig. 3, radial grooves or channels are provided extending from the center in order to start the milk from the center outward toward the periphery of the disks. It will be obvious that as the milk is worked through the disks, it will be disposed substantially in a thin layer, and the thinness of the layer will depend upon the proximity of the opposing faces of the disks upon which the cuts are formed. This degree of proximity may be controlled conveniently by making one of the shafts, as the shaft $g$ for instance, longitudinally movable in its bearings and for this purpose said shaft may be mounted upon an adjustable journal $o$ threaded in the stand $c$ and controlled through the medium of a micrometer wheel $p$.

In Figs. 5 and 6, another form of disk surface is illustrated in which there are simply grooves extending from the center clear out to the periphery. The edges of these grooves are sufficient to effect the emulsification of the milk and the grooves themselves work the milk toward the periphery of the disk.

The word "disk," as used herein, should be understood to refer to any element which may be provided with a surface to effect the desideratum referred to herein and it is obvious that such an element need not necessarily be of any mathematically precise shape.

The disks are adapted to be rotated very rapidly in opposite directions, pulleys $q$ being provided upon the shafts $f$ and $g$ for this purpose. In a machine of the character illustrated, these disks may be driven at an angular velocity of at least 8,000 rotations per minute. This operation effectively emulsifies the milk that is, breaks up the fat globules and apparently distributes the butter fat in minute particles throughout the mass which, as it drops from the disks into the bottom of the chamber, is somewhat thickened and constitutes a homogeneous liquid mass. In the bottom of this chamber are suitable heating means such as a hot water coil $r$ through which this mass is uniformly heated. This causes the butter fat to rise to the top of the mass in the form of a liquid. To permit this butter fat which has risen to the top of the mass to be drawn off without interference from the emulsified milk as it drops from the disks and without the disturbance which would otherwise be caused by the close proximity of the rapidly revolving disks, a hood $s$ is provided just beneath the disks and into this hood the butter fat rises and may be conveniently drawn off by a suitable cock-controlled tube $t$. The residue or remainder of the emulsified milk after the fat has been separated therefrom may be allowed to flow out of a suitable pipe $u$ leading from the bottom of the chamber, and this pipe $u$ is provided with an upstanding pipe $v$ which rises to the normal height of the liquid in the chamber and then is bent over and downwardly again, a vent $w$ being provided in the top. In this way the residue of the milk is constantly discharged while the liquid in the chamber is maintained constantly at the normal height. Moreover, the disturbance from the rapidly revolving disks to the convenient removal of the butter fat may be further obviated by the provision of a shield $x$ above the hood $s$, which shield may be in the form of a sieve.

The operation of the apparatus will be understood from the foregoing, as it has been clearly referred to in connection with the description of the various parts of the apparatus.

It will be seen that the apparatus may be kept continuously in operation, the butter fat being removed through a cock at the end of its draw-off pipe while the other ingredients of the milk are constantly discharged through the pipe $u$.

Various changes may be made in the construction of the apparatus, some of which have already been referred to, and the invention is accordingly not limited to an apparatus characterized by the structure shown and described.

We claim as our invention:

1. In an apparatus for extracting butter fat from milk, the combination of two disks having substantially flat roughened faces and mounted to rotate, and means to deliver the milk between the disks.

2. In an apparatus for extracting butter fat from milk, the combination of two disks having substantially flat roughened faces and mounted to rotate near together, and means to deliver the milk between the disks.

3. In an apparatus for extracting butter fat from milk, the combination of two disks having substantially flat roughened faces and mounted to rotate, and means to deliver the milk at the center of the disks.

4. In an apparatus for extracting butter fat from milk, the combination of two disks having roughened faces, and shafts upon which the disks are mounted to rotate, one of said shafts being hollow to deliver the milk between the disks.

5. In an apparatus for extracting butter fat from milk, the combination of two disks having roughened faces and mounted to rotate in a horizontal plane, and a hollow shaft to rotate the upper disk and deliver the milk between the disks.

6. In an apparatus for extracting butter fat from milk, the combination of two disks having substantially flat opposing faces mounted to rotate and having cuts in said faces, and means to introduce the milk between the disks.

7. In an apparatus for extracting butter fat from milk, the combination of two disks mounted to rotate and having their opposing faces cut to form sharp edges substantially in the planes of said faces, and means to introduce the milk between the disks.

8. In an apparatus for extracting butter fat from milk, the combination of two disks mounted to rotate and having their opposing faces cut to form sharp edges extending toward the periphery of the disks at a slight angle to the radial, and means to deliver the milk between the disks.

9. In an apparatus for extracting butter fat from milk, the combination of two disks, mounted to rotate and having cuts in their opposing faces and at least one of the disks having radial grooves extending from the center thereof, and means to introduce milk between the disks.

10. In an apparatus for extracting butter fat from milk, the combination of a chamber, means to emulsify the milk in the upper part of the chamber and means to heat the emulsified milk in the lower part of the chamber.

11. In an apparatus for extracting butter fat from milk, the combination of a chamber, rotating disks in the upper part thereof and a heating coil beneath.

12. In an apparatus for extracting butter fat from milk, the combination of a chamber, rotating disks therein, means to heat the lower part of the chamber, and a hood beneath the rotating disks for the fat to rise in.

13. In an apparatus for extracting butter fat from milk, the combination of a chamber, means in the upper part thereof to emulsify the milk, means in the lower part thereof to heat the emulsified milk, means to shield the emulsified milk and fat from the emulsifying means, and means to remove the separated fat.

14. In an apparatus for extracting butter fat from milk, the combination of a chamber, a disk in the upper part thereof, a vertical hollow shaft upon which said disk is mounted, a disk underneath the first named disk, a vertical shaft upon which the second named disk is mounted, and means to raise and lower one of the shafts to adjust the position of the disks with respect to each other.

15. In an apparatus for extracting butter fat from milk, the combination of a milk reservoir, a chamber below the same, rotating means to emulsify the milk in said chamber, a hollow shaft for said means leading from the reservoir, and a valve controlling the flow of milk from said reservoir into said hollow shaft.

16. In an apparatus for extracting butter fat from milk, the combination of means to convert the milk into an emulsion, and means to heat the emulsion.

17. In an apparatus for extracting butter fat from milk, the combination of a chamber, means to introduce milk into said chamber; and disks therein adapted to rotate in opposite directions to emulsify the milk into a homogeneous liquid mass.

18. In an apparatus for extracting butter fat from milk, the combination of a chamber, means to introduce milk into said chamber; and means to emulsify the milk therein into a homogeneous liquid mass.

19. In an apparatus for extracting butter fat from milk, the combination of a chamber, means to introduce milk into said chamber; and means arranged in the upper part of the chamber to emulsify the milk into a homogeneous liquid mass.

20. In an apparatus for extracting butter fat from milk, the combination of a chamber, means to introduce milk into said chamber, means to emulsify the milk into a homogeneous liquid mass, and means to separate the fat from said mass.

21. In an apparatus for extracting butter fat from milk, the combination of a chamber, means to introduce milk into said chamber, means to emulsify the milk into a homogeneous liquid mass, and means for continuously removing the fat from the chamber.

22. In an apparatus for extracting butter fat from milk, the combination of a chamber, means for supplying milk to said chamber, means in said chamber to emulsify the milk into a homogeneous liquid mass, means for continuously removing the fat from said chamber, and means for continuously removing the residue from said chamber, substantially as described.

This specification signed and witnessed this 11th day of March, A. D. 1907.

HENRY D. COOKE.
ALFRED FORNANDER.

Signed in the presence of—
  Ambrose L. O'Shea,
  Lucius E. Varner.